UNITED STATES PATENT OFFICE.

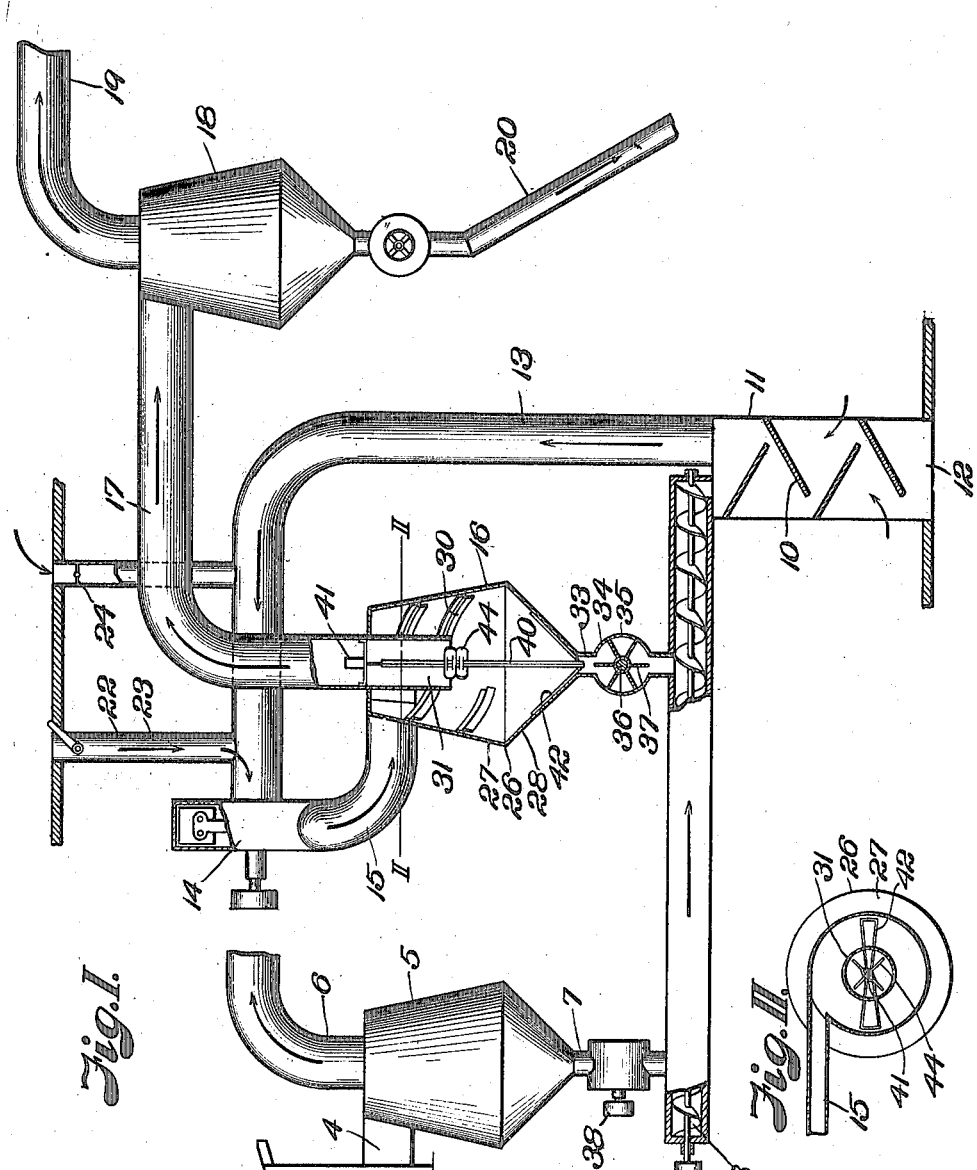

FREDERICK W. LEHRACK AND EDWARD P. KOEHN, OF KANSAS CITY, MISSOURI.

DUST-COLLECTOR.

1,145,903.  Specification of Letters Patent.  Patented July 13, 1915.

Application filed June 27, 1914. Serial No. 847,654.

*To all whom it may concern:*

Be it known that we, FREDERICK W. LEHRACK and EDWARD P. KOEHN, citizens of the United States, residing at Kansas City, in the county of Jackson and State of Missouri, have invented certain new and useful Improvements in Dust-Collectors; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to the reclamation of grain and heavy substances from dust collector systems, and more particularly to a process and apparatus in which the seconds from the grain cleaning machine, after passing through a dust collector and aspirator, are subjected to a further refining process; the principal object of the invention being to provide means for continuously circulating the seconds through the aspirator and one or more subsequent dust collectors until the dust and lighter particles are removed and the grain and heavy substances conserved for chicken feed and the like.

A further object of the invention is to provide means for continuously circulating the product of the floor sweeps, through the aspirator and subsequent dust collectors to reclaim the feed and remove the dust and lighter particles.

In accomplishing these objects we have provided the improved details of structure hereinafter described and illustrated in the accompanying drawings, wherein:

Figure I is a diagrammatic view of an apparatus constructed in accordance with our invention; parts being in section and others broken away for better illustration. Fig. II is a plan section on the line II—II, Fig. I, Referring more in detail to the parts: 1 designates a grain cleaning machine, which may be of any ordinary construction and provided with a grain outlet 2 and a fan 3 for blowing the seconds through the duct 4 and into the dust collector 5. The dust collector 5 may be of ordinary construction, and preferably of the cyclone type, and is provided with a tube 6 for conveying the dust to atmosphere, and with a neck 7 through which the seconds are conducted to the screw conveyer 8.

The conveyer is driven by means of a pulley 9 from any suitable source of power (not shown), and deposits the seconds onto the baffles 10 of an aspirator 11, where the grain and heavy substance falls through the aperture 12 to a bin (not shown), and the lighter particles are carried upwardly into the tube 13 by a current of air which enters the sides of the aspirator and which is induced by a fan 14.

With the ordinary dust collector, some of the grain and heavy particles are drawn into the tube 13 with the lighter particles and wasted by being conducted to the furnaces and consumed. The present system contemplates saving this waste, which annually amounts to a large sum. For accomplishing this saving we provide a tube 15, which conveys the product from the fan 14 into a cyclone dust collector 16 where the very light particles and dust are blown upwardly through the tube 17 to another dust collector 18 from which the fine dust ultimately passes into the atmosphere through a tube 19, and the refuse falls through a tube 20 into the furnaces.

The grain and heavy substances which enter the dust collector 16 fall into the conveyer 8 and pass through the aspirator a second time, along with the oncoming seconds from the collector 5. Branching from the tube 13 are floor-sweep conduits 22 comprising tubes 23, which are provided with dampers 24 and which may extend to any part of the building, so that grain and dust which collects on the floor of the mill or elevator may be swept into the conduits, the dampers 24 opened and the material drawn by suction into the tube 13.

It is apparent that all grain and heavy particles which are drawn upwardly through the tube 13 from the aspirator are returned to the dust collector 16 and that this circuit is continuous until the grain and heavy substances are entirely separated from the dust and light particles. The dust collector which we prefer to use comprises a casing 26 having a truncated cone-shaped upper portion 27 and an inverted cone-shaped lower portion 28. Entering the upper portion 27 at a tangent to the upper edge thereof is the inlet tube 15 from the blower 14, through which air and material from the fan is blown onto the downwardly spiraled vanes 30 in a whirl inside the casing, so that the heavy particles fall to the bottom of the collector, while the lighter particles are blown out through the lower portion 31 of the tube 17, which extends through the top of the casing and to a point near the center thereof. Extending from the base of the lower portion 28, of the collectors, is an outlet tube 33 having a valve 34 comprising an enlarged cylindrical portion 35 in which is revolubly mounted a shaft 36 having a plurality of blades 37 and a pulley 38, which may be connected to any source of power (not shown). The blades 37 revolve very slowly and are adapted to receive the grain and heavy substances and deposit them into the conveyer, thereby preventing the escape of air from the collector except through the tube 31.

In order to prevent dust from settling and hardening on the base of the dust collector, we have provided an agitator comprising a shaft 40 which is pivotally mounted in and supported from a bearing 41 in the tube 31. Pivotally mounted near the lower end of the shaft 40 are scraper arms 42 which lie against the inner face of the base portion 28, and rigidly mounted on said shaft are oppositely disposed vanes 44 against which the whirling current of air impinges to revolve the arms.

Having thus described our invention, what we claim as new therein, and desire to secure by Letters-Patent, is:

1. In a reclaiming apparatus, the combination with primary and secondary collectors, of connection between the collectors including an aspirator, and an intermediate collector arranged to circulate material received from the aspirator prior to discharging the same into the secondary collectors.

2. In a reclaiming apparatus, the combination with a plurality of collectors, of a conduit connecting the collectors, an aspirator interposed in said conduit, and connections between the aspirator and one of the collectors and between the last named collector and said conduit.

3. In a reclaiming apparatus, the combination with a collector and aspirator, of a conduit connecting the collector and aspirator, and a second collector connected with the conduit and adapted for receiving material from the aspirator, whereby material may circulate through the aspirator and second collector, for the purpose set forth.

4. The combination with a train of collectors, of means for delivering a mass of material to the first collector and for delivering dust from the last in train, an aspirator, means for conducting heavy matter from the first collector to the aspirator, an intermediate collector opening to the connecting means and to the last collector, a blower, and conduits leading from the aspirator to the blower and from the blower to the intermediate collector.

5. In an apparatus for reclaiming grain, a dust collector, an aspirator for said dust collector, a second dust collector, and a fan for establishing a circulation between said aspirator and second dust collector.

6. In an apparatus for reclaiming grain, a dust collector, an aspirator for receiving solid particles from said dust collector, a fan for drawing lighter particles from said aspirator, and a second dust collector for receiving the said particles from said fan and returning the heaviest of these particles to the aspirator.

7. In an apparatus for reclaiming grain, a dust collector, a conveyer for conducting grain and heavy substance from the dust collector, an aspirator for receiving said grain and heavy substance from said conveyer, a fan for drawing dust and lighter particles of said substance from said aspirator, and a second dust collector for receiving lighter particles of said substance and depositing the heaviest of these particles into said conveyer.

8. In an apparatus for reclaiming grain, a dust collector, a conveyer for receiving material from said dust collector, an aspirator for receiving material from said conveyer, a fan for drawing material from said aspirator, a second dust collector for receiving material from said fan and depositing material into said conveyer, and a valve in the base of each dust collector for removing material and preventing the escape of air from said dust collectors.

9. In an apparatus for reclaiming grain, a dust collector, a conveyer for receiving material from said dust collector, an aspirator for receiving material from said conveyer, a fan for drawing material from said aspirator, a second dust collector for receiving material from said fan and depositing material into said conveyer, and an agitator in each of said dust collectors operable from said fan.

10. In an apparatus for reclaiming grain, a dust collector, a conveyer for receiving material from said dust collector, an aspirator for receiving material from said conveyer, a fan for drawing material from said aspirator, a second dust collector for receiving material from said fan and depositing material into said conveyer, a third dust collector for receiving material from said second dust collector, and a tube for delivering material from said third dust collector.

11. In an apparatus for reclaiming grain, a dust collector, a conveyer for receiving material from said dust collector, an aspirator for receiving material from said conveyer, a fan for drawing material from said aspirator, a second dust collector for receiving material from said fan and depositing it in said conveyer, and a supply conduit connected with said fan and adapted for depositing material into said second dust collector and aspirator.

12. In an apparatus for reclaiming grain, a dust collector for depositing seconds into a separating circuit comprising an aspirator, a fan for drawing material from said aspirator, and a dust collector for receiving material from said fan and depositing part of said material into said aspirator, and another dust collector for receiving another part of the material from the dust collector in the separating circuit.

In testimony whereof we affix our signatures in presence of two witnesses.

FREDERICK W. LEHRACK
EDWARD P. KOEHN.

Witnesses:
    EDWARD FOX,
    CORBIN G. LOVEJOY